April 11, 1967 C. H. BECKER 3,314,074

COHERENT LIGHT BEAM RECORDER

Filed Jan. 22, 1965 3 Sheets-Sheet 1

FIG. I

INVENTOR.
CARL H. BECKER

BY
Townsend and Townsend
ATTORNEYS

INVENTOR.
CARL H. BECKER
BY
Townsend and Townsend
ATTORNEYS

COHERENT LIGHT BEAM RECORDER

Filed Jan. 22, 1965 3 Sheets-Sheet 3

INVENTOR.
CARL H. BECKER
BY
Townsend and Townsend
ATTORNEYS

United States Patent Office 3,314,074

Patented Apr. 11, 1967

3,314,074

COHERENT LIGHT BEAM RECORDER

Carl H. Becker, Palo Alto, Calif., assignor to Precision Instrument Company, Palo Alto, Calif.

Filed Jan. 22, 1965, Ser. No. 427,392
3 Claims. (Cl. 346—108)

The present invention relates in general to a light recording system utilizing coherent optical energy as the recording source to produce an instantaneous reproducible record with a diffraction limited bit size.

Existing recording techniques, magnetic, photographic and electron beam recording, suffer from a number of deficiencies. The major deficiencies with magnetic recording are the one dimensional recording principle and the limited recording speed which stems from the necessity for mechanical connection between the recording head and the recording medium. These limitations present themselves both in the recording and the reproduction processes. Additionally, due to the mechanical connection, a certain amount of wear of the recording head and recording medium results during the recording and reproducing operations which limits the life of the recording. In photographic recording while the recording operation can be performed at the speed of light with no contact between the recording source and the recording medium, the necessary developing process prohibits the use of such recording processes in applications where instantaneous production is required. Another essential deficiency of photographic recording methods results from photographic diffusion which spreads the recording elements far beyond the size of their optical origin. Electron beam recording must take place within a vacuum which places severe environmental and fabrication limitations on the processes and prohibits instantaneous readout. Another essential deficiency of electron beam recording lies in the difficulty of reproduction. However, the reproducing means in accordance with the present invention can be utilized.

In the co-pending application of Carl H. Becker entitled Optical Recording System, Ser. No. 405,298 filed Oct. 20, 1964, a system is described wherein a coherent light beam is intensity modulated with information to be recorded and focused upon a recording medium within the diffraction limits of the system. The medium is provided with an opaque unidensity coating which is vaporized by sufficient focused coherent light beam energy to create bits of information in the form of holes in the unidensity coating. Instantaneous reproduction of the recorded information can be accomplished during the recording process by detecting the light transmitted through the recording medium, and subsequent reproduction of the recorded information can be accomplished by scanning the primary recording with an unmodulated focused coherent light beam with a power below that which would destroy the previously recorded information.

The object of the present invention is to provide such a coherent light recording system and method wherein a substantially continuous recording is produced with maximum information density. The recording is made in minimum bit size equal to the diffraction limits D of the system, i.e. on the order of the wavelength of the coherent light or laser beam utilized for recording. When $\lambda$ is the coherent light wavelength the bit size D is determined from:

$$D=1.22\lambda\left(\frac{f}{o}\right)$$

where $f$ is the focal length of the focusing lens and $o$ is the aperture of the laser.

Broadly stated, the present invention to be described in greater detail below is directed to the method and apparatus for imaging a modulated continuous wave beam of coherent light along a scan path at a recording station onto the recording medium or film. The elongate recording station comprises the 180° arc of a circle, and the light beam is deflected along a path from the axis of such circle to the arc where it is focused on the film. This beam path is swept through the 180° arc during a given interval to trace on the recording medium a semicircle of focus aligned at a slight angle with respect to the recording station arc. At the end of each sweep the beam path is again caused to sweep the same arc in successive intervals each of which is an instantaneous continuation of the information at the end of the next preceding interval. Sweeping of the beam path is accomplished utilizing a recording head provided with two objective lens systems located on a diameter of the recording head.

With this construction and method no mechanical contact exists between the recording element or source and the recording medium.

In the preferred embodiment of the present invention the modulated light beam is caused to be first directed through one of the objective lens systems during the interval in which such lens system scans 180° of the recording arc and is then directed through the other objective lens system as such other objective lens system is caused to scan the same 180° recording arc in the suceeding interval.

As will appear from the following specification, the present invention can be utilized in a number of different types of recording systems such as, for example, video recording on a moving tape, instrumentation recording on a moving tape or computer storage and retrieval of information on a temporarily stationary hollow cylindrical recording material.

Other objects of the present invention will become apparent upon reading the following specification and referring to the accompanying drawings in which similar characters of reference represent corresponding parts in each of the several views.

Figure 1:
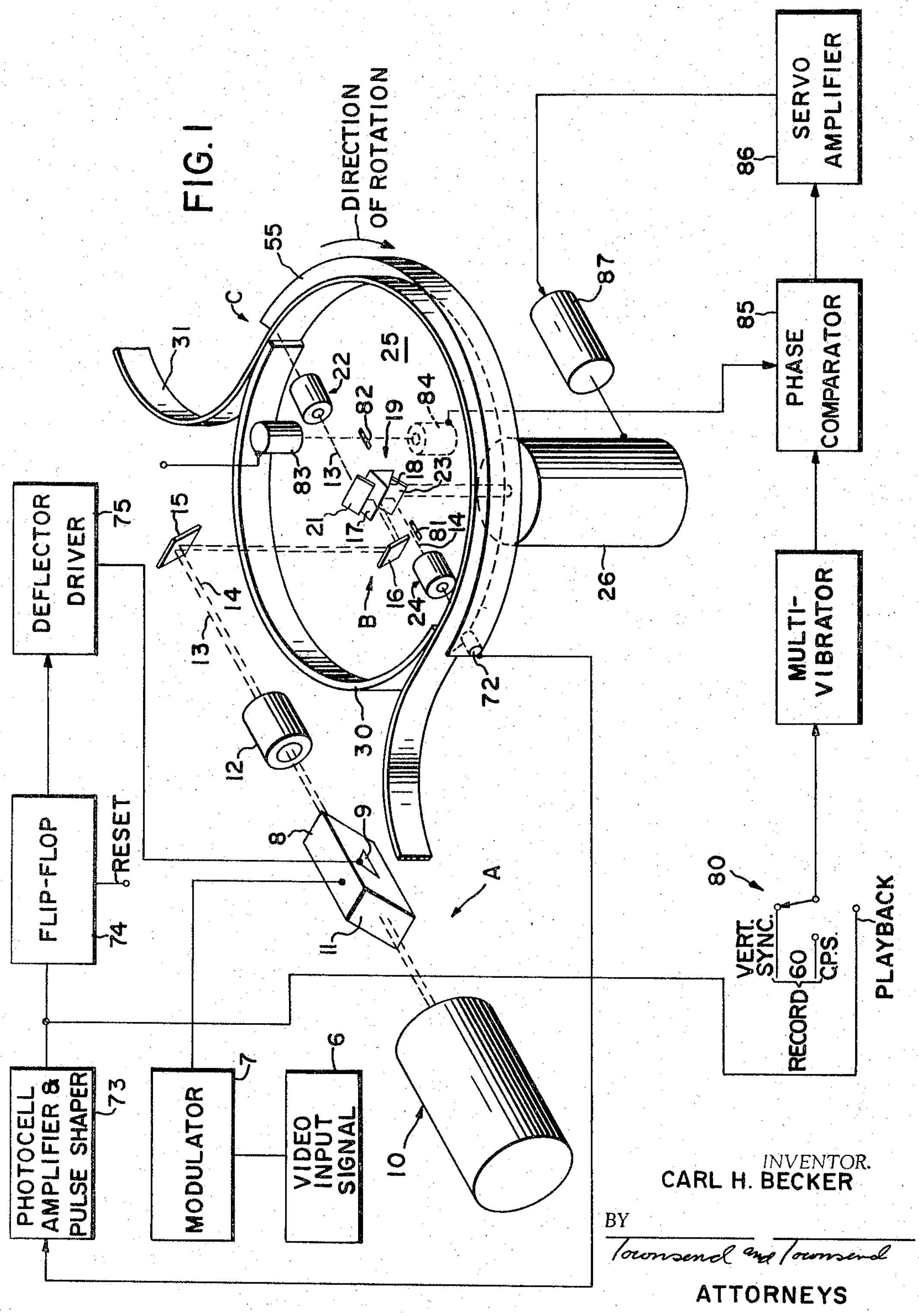
FIGURE 1 is a schematic perspective view partially in block diagram form generally illustrating the present invention.
Figure 2:
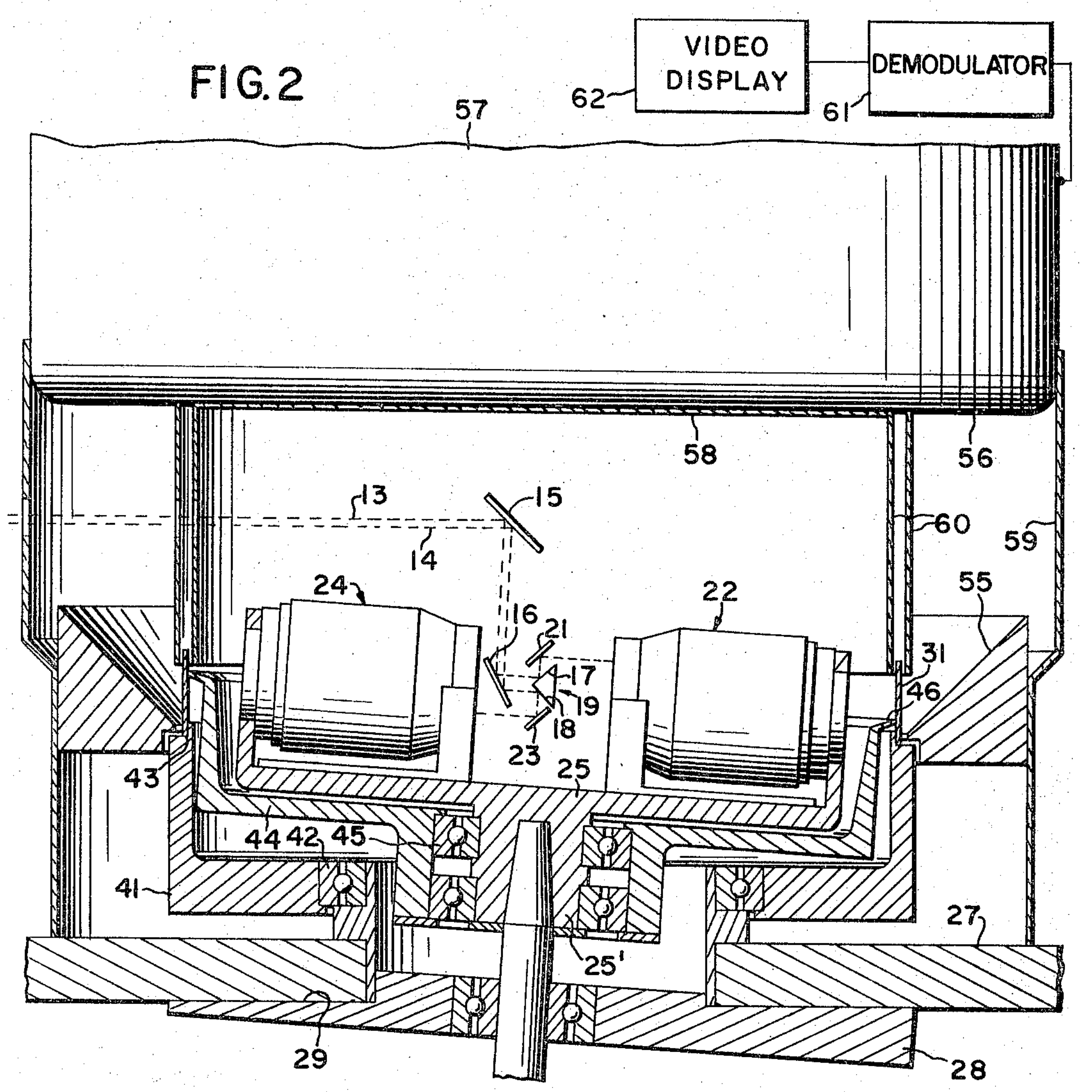
FIGURE 2 is an enlarged cross sectional view of a portion of the structure shown in FIGURE 1.

While the present invention is applicable for use in recording and reproducing a variety of different types of information such as, for example, instrumentation recording and computer storage and retrieval as briefly described in some detail below, for purposes of illustration the invention will be described with reference to method and apparatus specifically applicable for video recording and reproduction.

Referring now to FIGURES 1–4 a video recording and reproduction method and apparatus is illustrated wherein a signal in the form of a modulated beam of coherent light from a light generator generally designated A is directed through a beam guiding assembly B to a recording head and film drive C for producing a series of closely spaced helical traces across a film with the information contained in the traces at the beginning of one helical trace following substantially instantaneously from the information at the end of the adjacent preceding trace.

The light generating assembly A includes a continuous wave optical maser of laser 10 such as, for example, an argon laser operating in a single mode. The coherent light beam produced in the argon gas is modulated by an electro-optical beam modulator and deflector 11 such as, for example, a single crystal barium titanate located internally of the laser 10, i.e. between the lasing medium and the reflective surfaces such as a Fabry Perot 12.

The modulation of the laser beam in the beam modulator deflector 11 includes the application of a video signal 6 which is passed through a modulator 7 and is applied to electrodes 8 on the top and bottom of the crystal 11 for varying the polarization of the crystal 11. In this manner the intensity of the laser beam is intensity modulated with the video signal.

The variation in the intensity of the laser beam during each cycle is at least from a level which does not remove an opaque coating on the recording medium, as described below, sufficiently to permit light transmission through the medium up to a level at which the laser beam does remove the opaque coating from the medium so that light is at least partially transmitted through the medium without destruction of the medium.

The modulation of the laser beam in the beam modulator 11 also includes the application of a vertical step voltage on triangular side electrodes 9 for deflecting the beam either up or down as controlled by a servo mechanism as described in detail below. The deflection results in either an upper output beam 13 or a lower output beam 14 for recording successive traces on the recording medium.

Electro-optical modulation/deflection of the laser beam internal of the laser 10 has several advantages compared to previously used external modulation. First of all, modulation/deflection does not reduce the maximum available laser power assuming no absorptive losses in the modulator/deflector material. Particularly, it eliminates the analyzer of external modulation systems. Secondly the driving voltages of the internal modulator/deflector are by at least one order of magnitude smaller than required for external operation.

By application of the beam deflection voltage to the beam modulator/deflector 11 upper and lower beams 13 and 14 are successively produced and directed through Fabry Perot 12 to a tilted, fixed mirror 15 located above but slightly off the axis of the recording head and drive assembly C. The mirror 15 is positioned at an angle to reflect the beams 13 and 14 to a lower tilted fixed mirror 16 from which the upper and lower beams 13 and 14 are reflected respectively to upper and lower reflecting surfaces 17 and 18 of a fixed prism 19 mounted on the axis of the recording head. The upper beam 13 reflected from the upper reflecting surface 17 impinges upon an angularly disposed mirror 21 which is mounted on and rotates with the recording head C and directs the upper beam 13 into a first objective lens system 22. The lower beam 14 is reflected from the lower prism reflecting surface 18 onto an angularly disposed mirror 23 which is also mounted on and rotates with the recording head and reflects the lower beam into a second objective lens system 24.

The objective lens systems 22 and 24 and the rotatable mirrors 21 and 23 are all mounted on a rotating disc 25 driven by the scan drive motor 26. The scan drive motor 26 is mounted on the recording deck 27 of the recording apparatus by means of a mounting plate 28 which has a beveled mounting surface 29 for positioning the rotational axis of the disc 25 at a slight angle $\alpha$ with respect to the rotational axis of the tape as described in greater detail below. This mounting arrangement permits all structure associated with the rotating disc 25 and drive motor 26 to be mounted around the axis of the drive motor and the entire assembly positioned at the desired angle to the recording deck 27 by precision machining of only angularly machined surface 29 on the mounting plate 28.

The objective lens systems 22 and 23 are located on a diameter of the disc 25 for focusing light beams 13 and 14 on the recording medium or film 31 which is moved slowly in a direction opposite to the scanning beams from a supply reel to a take up reel around slightly more than the 180° arc of the recording station. All but 180° of the film is masked from view of the recording beams 13 and 14 by a shield 30 and by means of a guiding assembly described in greater detail below the film is maintained out of mechanical contact with the rotating disc 25 located centrally of the recording station.

Figures 4, 5, 6:
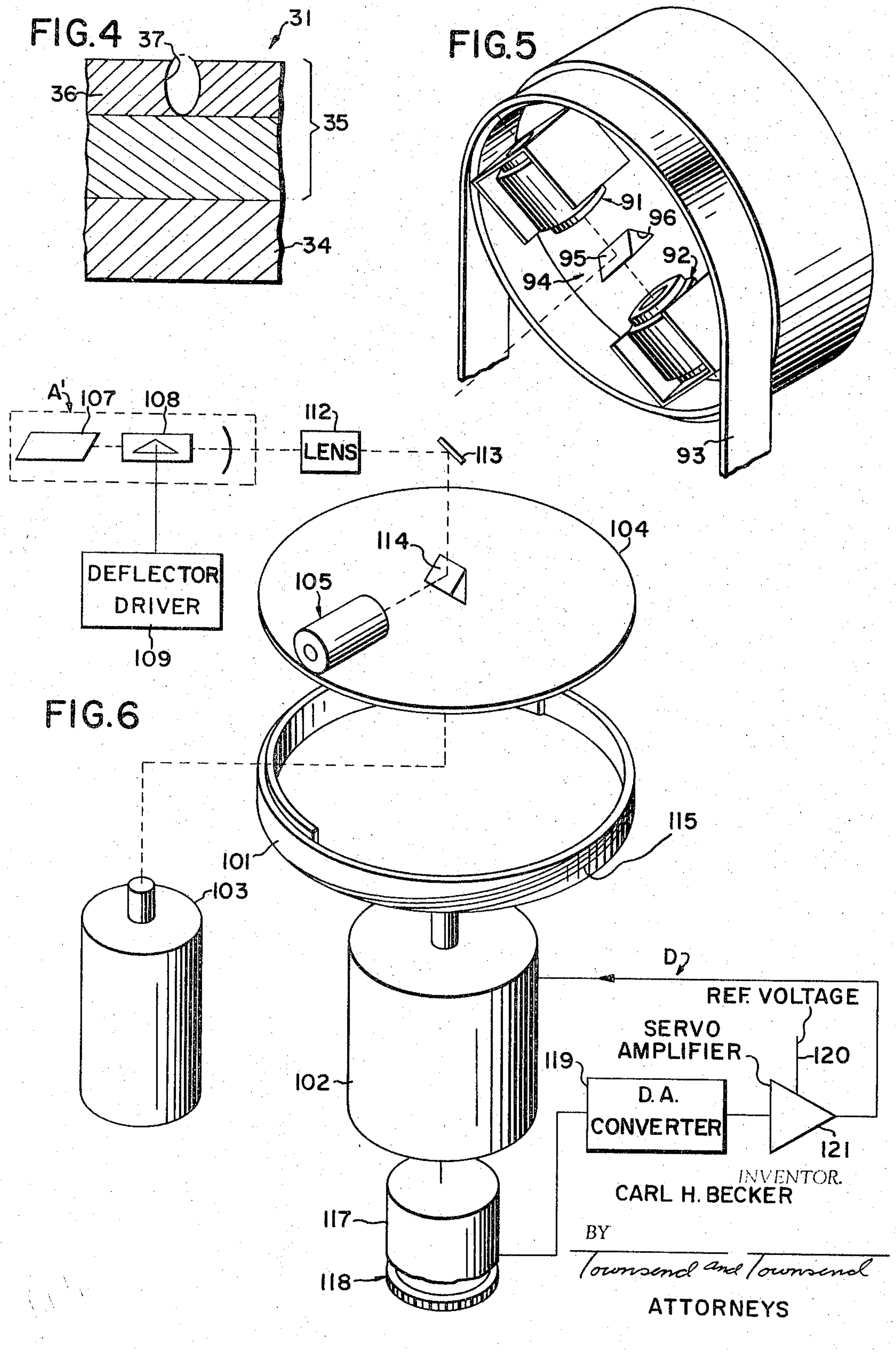
FIGURE 4 is an enlarged cross sectional view of the recording medium.
FIGURE 5 is a perspective view of an alternative embodiment of the present invention.
FIGURE 6 is a schematic perspective view of still another alternative embodiment of the present invention.

As shown in FIGURE 4 the film 31 is made up of a transparent film base or carrier 34 which is provided with a coating 35 on the side facing the swept modulated light beam. The file base 34 can be any transparent film such as, for example, cellulose nitrate or acetate or plastic and the coating 35 any appropriate opaque layer of uniform density such as, for example, a developed silver halide gelatin photographic emulsion or a dyed gelatin. The opaque coating must be as absorptive as possible with as little reflectivity as possible. Metals are good absorbers but also good reflectors. Hence, ordinary thin films of absorptive material such as gold, silver, germanium, silicon, etc. are not suitable since they reflect most of the light and absorb only a small part of the light. However, these metals in suspension or in a dispersion such as, for example, colloidal silver in a photographic emulsion after photographic development are suitable. India Ink which is highly dispersed carbon can also be used. A coating 35 which has been exposed and developed as described below so that only an accurately controlled portion 36 is opaque is preferred.

Ideally, the thickness and opacity of the film coating 35 is selected with respect to the modulated intensity of the focused laser beam such that the maximum intensity of the beam entirely vaporizes a diffraction limited spot in the coating 35 to transmit light through the carrier 34 without destroying the carrier 34 and such that the minimum intensity of the focused laser beam is insufficient to remove the coating 35 to permit transmission of light into the carrier 34.

Of course, light transmission through the carrier 34 is relative depending upon the transmissivity of the coating 35 so that instead of passing absolutely no light through the coating 35, in practice, a certain amount of light may be transmitted through the coating and the operating threshold of the detection apparatus described in greater detail below adjusted to detect only the modulation of the laser beam. Therefore, the words "opaque" and "transparent" are used herein to include the situation of relative transmission, i.e. where a certain amount of light is transmitted through the opaque coating.

It is known that a coherent light beam can be focused to the smallest possible bit size characterized as Debye's ellipsoid of focusing and under ideal conditions the focus represents an ellipsoid of revolution with two small axes $$.55\lambda\left(\frac{f}{o}\right)$$

and large axis (in the direction of propagation of the laser beam) of $$1.1\lambda\left(\frac{f}{o}\right)$$

In practice, however, a typical achievable ellipsoid has main axes approximately three times as large as the theoretical values. Due to the vacuum temperature of the coherent light beam at the focal point of the order of 30,000° K. in the operative example given below evaporation pressures of thousands of atmospheres result, which effect the opaque coating layer material during recording so that characteristic ellipsoidal holes as illustrated as 37 in FIGURE 4 result. The holes show quantum-mechanical tunneling of the laser beam at the opening of the ellipsoid.

As can be seen, as long as the thickness of the opaque developed surface layer 36 of the emulsion 35 is approximately $$3.3\lambda\left(\frac{f}{o}\right)$$

in practice, desired sensitivity for the recording system can be achieved.

The film 31 is guided in the recording head and film drive assembly C by means of a guide cup 41 rotatably mounted by a bearing 42 on the recording deck 27 and rotatable about a vertical axis. A tape guiding shoulder or edge 43 is provided at the upper periphery of the guide disc 41 for supporting the lower edge of the film 31 as it is transported past the rotating disc 25. Nested within the guide cup 41 is an idler wheel 44 rotatably mounted by means of a bearing 45 on an axially aligned shoulder portion 25' of the rotatable disc 25. The idler wheel 44 is provided with an idler ring 46 at its upper periphery which is arranged to contact the film 31 and hold the film 31 at the circle of focus of the coherent light beam out of contact with the rotating disc 25 as well as to track the film continuously against the guide edge 43 of the guide cup 41. The particular portion of the film 31 on which the trace is made is continuously maintained at the focus of the lens systems 22 and 24 independent of the projection of the circle of focus onto the deck. This projection is actually an ellipsoid.

Additionally, the ring 46 of the idler wheel 44 continuously tracks the film 31 against the guide cup 41. During rotation of the rotating disc the idler wheel 44 rotates slowly with the moving film and the idler ring portion 46 continuously urges the film against the guide edge 43 during 180° guiding of the film through the recording head.

Figure 3:
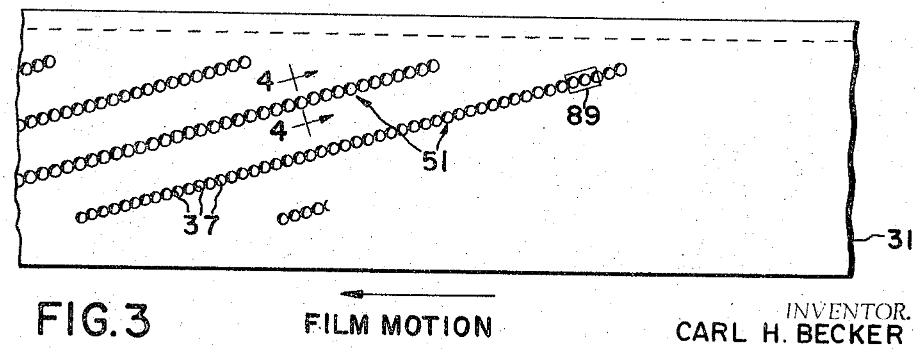
FIGURE 3 is an enlarged elevation view of the helical scan recorded on the recording medium.

Since the circle of focus is inclined with respect to the guide edge 43 by the angle $\alpha$, as the film 31 is directed through the recording head the coherent light beam traces a helical path. This path forms a straight line trace 51 across the film 31 as best shown in FIGURE 3 so that the focused radiation energy evaporates ellipsoidal portions 37 of the opaque surface layer 36 thus creating bits of information in the form of holes in the opaque layer 36 of the film 31.

During each 180° rotation of the recording disc 25 one helical trace is recorded by one of the lens systems. At the end of the 180° arc the coherent light beam is switched to the other lens system which begins to form another trace spaced from the previous trace due to motion of the film through the recording head.

During the recording process, instantaneous readout of the recorded information takes place by means of photoelectric detection of the light transmitted through the holes 37. The photoelectric detection includes a circular mirror 55 surrounding the 180° recording arc and positioned on the opposite side of the film from the impinging coherent light source. This mirror 55 is positioned at an angle for reflecting the light energy transmitted through the film to the input surface 56 of a photomultiplier 57. The remaining portion of the input surface of the photomultiplier is shielded by a shield 58 above the central portion of the rotating disc 25. An exterior shield 59 extends from the outer periphery of the photomultiplier to the exterior surface of the mirror 55, and interior shields 60 project from the shield 58 down to a position covering the upper edge of the film 31 to shield the input surface 56 of the photomultiplier from all light other than that transmitted through the film. The detected signal from the photomultiplier 57 is passed through a demodulator 61 for a video display at 62.

Secondary readout or reproduction of the recorded information occurs by passing the recorded film through the recording stations with no input signal applied to the modulator 11 and with an attenuator provided along the coherent light beam path to produce a low power laser beam that is non-destructive of the previously traced original informtaion, i.e. the energy of the coherent light beam is below that which vaporizes the opaque surface 36 of the film. Alternatively, a separate low power laser can be utilized for reproduction of the recorded information. This implies that reproduction stations can be provided which incorporate only a low power coherent light source without provision for recording.

Stability during recording/reproduction is maintained by two servo-systems which control the rotary speed of the objective lens systems and the tape speed respectively. The servo-systems include a system for controlling tape movement with a capstan 71 such as by means of comparison with 60 cycles absolute time. The other system comprises means for controlling the angular frequency, position and phase of the rotary objective lens systems by means of comparison with 60 cycle absolute time. This latter servo-system is correlated to the deflection of the laser beam for each half revolution of the rotating objective lens systems.

As shown in FIGURE 1, a photocell 72 is embedded in the angularly disposed circular mirror 55 and is located so that the coherent light beam strikes it just prior to reaching the shield 30 to drive the photocell amplifier 73 and a flip-flop control 74.

The flip-flop 74 is initially reset so that the deflector portion of modulator/deflector 11 is inoperative and the beam from the laser travels through the modulator/deflector 11 emerging as the lower laser beam 14 which is directed to the objective lens system 24. As the disc 25 rotates to the end of the 180° recording arc this lower beam is picked up by the photocell 72 which drives the amplifier 73 which in turn drives the flip-flop 74 causing the deflector driver 75 to activate. This activation on the deflector 11 changes the deflector polarization to cause the beam passing therethrough to shift to a new position and emerge as the upper output beam 13 which is directed to the other objective lens system 22. As this beam is swept across the 180° recording station the photocell 72 again picks up the beam near the end of the sweep, and the flip-flop 74 is again driven causing the deflector driver 75 to become inactive whereupon the laser beam is again caused to emerge from the deflector as the lower beam 14. Thus, the beam alternatively passes through each objective for every 180° rotation of the rotating disc 25.

A pair of slits 81 and 82 are provided in the rotating disc 25 for permitting passage of light from a small auxiliary light source 83 mounted above the rotating disc 25 to a photocell 84 mounted below the rotating disc 25 twice per revolution providing a fixed reference of disc position. The output from the photocell 84 is amplified and compared in a phase comparator 85 during record with either the vertical synchronization pulses of a video signal or a 60 cycle reference determined by the position of a reference control switch 80.

During playback the output from the photocell amplifier 73 of photocell 72 is connected to the phase comparator 85 by the switch 80 so that the output from the photocell 84 is compared with the output from the photocell 72. An error in the position of the track with respect to the reference gives a positive or a negative output from the phase comparator 85 which is applied through a servo amplifier 86 to a servo motor 87 which drives the stator of the scaning drive motor 26 to correct the position. Either the size of photocell 72 can be on the order of the width of a trace 51 or a mask as shown in FIGURE 3 can be placed between the film and the photocell 72 for proper location of the photocell on only one track.

While each of the lens systems is provided with means for adjusting the focusing thereof, dynamic focusing of the system can be provided with a hollow axis adjustment structure (not shown) mounted with its axis concentric with the axis of the disc 25 and with coupling connections to the lens systems 22 and 24 thereby to permit micrometer adjustments of the focus of the lens system during rotary motion of the objective lens systems.

By way of example, a video recording/reproducing assembly utilizing the present invention incorporates a blue coherent light beam from a single mode continuous wave argon laser of .4880 micron wavelength and 350 milliwatt power output focused to a bit diameter of one micron. With a 16 millimeter film traveling at a speed of approximately 0.466 cm./second and a recording head traveling at 12.4 m./second with its axis tilted at an angle of approximately 3°28′ one trace on the film includes approximately 206, 666 bits with traces spaced approximately three microns apart. This corresponds to an obtainable information bandwidth of 6.2 megacycles per second so that video signals can be recorded on the film at a recording/reproducing capacity of 2 hours on a one-hundred foot film length.

In the particular operative example with the laser wavelength of of 6328 A. before recording a photographic microfilm emulsion of high resolution (Recordak SO 267) is exposed to monochromanic ultraviolet radiation of 2537 A. from a low pressure mercury germicidal lamp so that upon development to a density of more than 3.0 in a fine grain developer an opaque surface layer 36 of desired thickness can be achieved. Due to the strong absorption of this wavelength in the photographic emulsion, and due to the photographic characteristics of the microfilm in the ultraviolet, the emulsion 35 shows after development a black layer of silver colloid of essentially two microns thick extending exactly below the exposed emulsion surface even though the total emulsion thickness is 8 microns. Optimization of bit focusing is achieved with the photographic density for the opaque service layer 36 on the order of 3. Densities below and above the desired density reduce the sensitivity of the process.

For extremely wideband recording on the basis of this invention, utilizing an ultraviolet laser, for example at 2542 A., instead of the operative example described above in conjunction with 6328 A., selection of photographic emulsion and exposure by ultraviolet radiation have to be adjusted to the shorter Debye ellipsoid of the ultraviolet diffraction limits. Thus, the thickness of the photographic layer again equals approximately the long axis of the Debye ellipsoid.

FIGURE 5 illustrates an alternative construction for the light guiding assembly for directing light from a laser (not shown) to the two objective lens systems 91 and 92 which focus the laser beam onto the recording film 93 over a 180° arc. In this embodiment the laser beam is divided equally between the first and second objective lens systems 91 and 92 respectively so that half of the beam is always focused through each of the lens systems. With this construction one of the focused beams is always recording a trace on the film 93 during a sweep through 180° while the light from the other lens can be utilized to record time reference signals on a control track for servo purposes to control operation of the recording head and the moving film.

The light beam is divided by the prism 94 located at the center of the recording head and provided with a first face 95 which reflects 50% of the coherent light into the first objective lens system 91 and passes the remaining 50% of the light to a second face 96 which is totally reflecting and which directs the remaining 50% of the light to the second objective lens systems 93.

The apparatus described with reference to FIGURES 1–5 and the illustrative example given above have illustrated use of the present invention as applicable to a video recording and reproduction system.

As previously pointed out the invention is equally applicable for instrumentation recording/reproduction. With the same operating parameters continuous recording/reproduction is performed at 6.2 megacycles/second or 12.4 megabits/second. Shifting from one objective to the other objective is provided within 100 nanoseconds, suppressing only one bit of information at every half cycle of the objective rotation. Less information is lost with a faster shift. Instead of the previously mentioned 50 feet per hour reproduction, secondary reproduction can be speeded up to ten times the recording speed, i.e., 124 megabits/second on 500 feet per hour.

Still another utilization of the present invention is illustrated in FIGURE 6 which shows a computer storage and retrieval apparatus. In this structure information is recorded and reproduced from a hollow cylindrical or drum shaped recording medium or film 101 which can be replaced with film containing other recorded information and which is driven by a random access servo motor 102. The servo motor 102 is positioned with its axis at a slight angle with respect to the axis of a head drive motor 103 which drives the recording disc 104 on which is mounted a focusing lens system 105.

Light from a coherent light beam generator A′ which includes a gaseous lasing medium in a cavity 107, a modulator deflector 108 driven by a deflector drive 109, and a Fabry Perot 111 is directed through a lens 112 and deflected by mirrors 113 and 114 located on the axis of the disc 104 to direct light into the lens system 105 and thence onto film 101. The telescopic double lens arrangement is utilized to provide electro-optical deflection at some distance from the film surface.

The drive motor 103 drives the disc 104 at a constant speed during both recording and reproduction. The tracks 115 of information can be recorded or reproduced in sequence or in random manner by means of a position servo mechanism D operated in conjunction with the electro-optical modulator deflector 108.

In one method of helical scan operation a mechanical positioner made up of a servo motor angular shaft position sensor 117 and associated circuits (not shown) roughly position the film 101 and a detent mechanism schematically illustrated at 118 holds the film in a rigid position. The electro-optical deflector 108 causes the laser beam to scan a number of tracks in successive increments thereby permitting recording at any desired position on the film 101 and permitting rapid access to any track within a group of traces 115 for reproduction. As described with reference to FIGURES 1–4 reproduction is accomplished with a lower power coherent light beam and detection via a photomultiplier (not shown) for sensing the light transmitted through the film 101.

Due to the angular orientation of the axes of the film 101 and the disc 104, the recorded tracks on the film 101 are helically arranged. The number of mechanical detent positions required will depend upon the physical size of the film record and the limitation in electro-optical deflection due to the optical system itself, such as, for example, the lens aperture.

The angular shaft position sensor is utilized in random access reproduction of any particular track. By setting up an addressing rotation in digital form for each track, a given address directed to the servo motor 102 rotates the film 101 to the desired position. For example, the reference voltage 120 applied to the servo system can correspond to a given address, and the servo will continue to drive until the reference voltage 120 and an output voltage form a digital-analog converter 119 corresponds in a servo amplifier 121. On the basis of the parameters described above for the video recording/reproduction system $1 \times 10^9$ bits can be stored in one film storage unit 101.

Although the foregoing invention has been described in some detail by way of illustration and example for purposes of clarity of understanding, it is understood that certatin changes and modifications may be practiced within the spirit of the invention as limited only by the scope of the appended claims.

What is claimed is:

1. In a system for recording by impingement of a high intensity coherent light beam wherein a surface of a recording medium is modified in proportion to the intensity of the light beam; means for transporting said medium past a circular recording station including a guiding edge; means positioning said beam at successive intervals in a scan path along said recording station with the scan path positioned at an angle with respect to said guiding edge, each of said successive intervals being an instantaneous continuation of the information in the scan path at the end of the preceding interval; said beam positioning means including a pair of beam positioning components; each of said components operating to independently scan said beam along said scan path during alternate intervals to produce a series of closely spaced recorded traces across said recording medium.

2. In a system for recording by impingement of a high intensity coherent light beam wherein a surface of a recording medium is modified in proportion to the intensity of the light beam; a recording station lying along an arc of a circle; means for transporting said medium past said recording station; a rotatable circular recording head provided with means for imaging the beam over the length of the arc of said recording station during successive intervals, each of said successive intervals being an instantaneous continuation of the information in the scan path at the end of the preceding interval, said recording head positioned with its rotational axis at an angle to the axis of said recording station circle, said imaging means including two objective lens systems located on a diameter of the recording head on opposite sides of the center thereof; and means for directing at least a portion of said light beam through one of said objective lens systems during a series of alternate intervals and at least a portion of said light beam through the other of said objective lens systems during the set of remaining alternate intervals.

3. The recording system of claim 2 wherein said directing means includes means for switching said light beam through first one of said objective lens systems and then the other of said lens systems during successive intervals.

References Cited by the Examiner

UNITED STATES PATENTS

| | | | |
|---|---|---|---|
| 1,792,264 | 2/1931 | Alexanderson | 346—108 X |
| 2,668,473 | 2/1954 | Brixner | 352—84 |
| 3,256,524 | 6/1966 | Stauffer | 346—76 |

RICHARD B. WILKINSON, *Primary Examiner.*

J. W. HARTARY, *Assistant Examiner.*